United States Patent
Yim et al.

(10) Patent No.: US 10,915,257 B2
(45) Date of Patent: Feb. 9, 2021

(54) SEMICONDUCTOR DEVICE AND SEMICONDUCTOR SYSTEM

(71) Applicant: Samsung Electronics Co., Ltd., Suwon-si (KR)

(72) Inventors: Myung Kyoon Yim, Seoul (KR); Ho Yeon Jeon, Hwaseong-si (KR); Sang Woo Han, Suwon-si (KR); Taek Kyun Shin, Gwangmyeong-si (KR); Woo Sung Lee, Seoul (KR); Seung Hyun Choi, Suwon-si (KR)

(73) Assignee: Samsung Electronics Co., Ltd.

( * ) Notice: Subject to any disclaimer, the term of this patent is extended or adjusted under 35 U.S.C. 154(b) by 561 days.

(21) Appl. No.: 15/806,640

(22) Filed: Nov. 8, 2017

(65) Prior Publication Data

US 2018/0225053 A1 Aug. 9, 2018

(30) Foreign Application Priority Data

Feb. 7, 2017 (KR) .................. 10-2017-0016880

(51) Int. Cl.
*G06F 1/3206* (2019.01)
*G06F 3/06* (2006.01)
*G06F 1/3296* (2019.01)
*G06F 15/78* (2006.01)
*G06F 1/3234* (2019.01)

(52) U.S. Cl.
CPC .......... *G06F 3/0625* (2013.01); *G06F 1/3206* (2013.01); *G06F 1/3243* (2013.01); *G06F 1/3296* (2013.01); *G06F 3/065* (2013.01); *G06F 3/0679* (2013.01); *G06F 15/7821* (2013.01)

(58) Field of Classification Search
None
See application file for complete search history.

(56) References Cited

U.S. PATENT DOCUMENTS

| | | |
|---|---|---|
| 6,745,335 B1 | 6/2004 | Kusano |
| 7,219,245 B1 | 5/2007 | Raghuvanshi |
| 7,248,034 B2 | 7/2007 | Watanabe et al. |
| 7,447,919 B2 | 11/2008 | Leipe et al. |
| 7,523,328 B2 | 4/2009 | Seo |
| 7,643,365 B2 | 1/2010 | Meguro et al. |
| 7,689,845 B2 | 3/2010 | Narendra et al. |
| 8,069,361 B2 | 11/2011 | Tamura et al. |
| 8,201,038 B2 | 6/2012 | Graas et al. |

(Continued)

FOREIGN PATENT DOCUMENTS

JP 2003256069 9/2003

*Primary Examiner* — Paul Yen
(74) *Attorney, Agent, or Firm* — Onello & Mello, LLP

(57) ABSTRACT

A semiconductor device and a semiconductor system are provided. A semiconductor device includes a monitoring circuit receiving a first operating voltage and a second operating voltage, which is different from the first operating voltage, from a Power Management Integrated Circuit (PMIC) and monitoring a duration of use of a System-on-Chip (SoC) at each of the first and second operating voltages; a processing circuit calculating a normalized value based on predetermined weight information from the duration of use of the SoC at each of the first and second operating voltages; and a voltage circuit determining whether to increase an operating voltage of the SoC by comparing the normalized value with a predetermined value.

20 Claims, 7 Drawing Sheets

(56) References Cited

U.S. PATENT DOCUMENTS

| | | | |
|---|---|---|---|
| 8,301,924 B2 | 10/2012 | Kim et al. | |
| 9,483,068 B2 | 11/2016 | Raja et al. | |
| 9,484,892 B1 | 11/2016 | Kakoee et al. | |
| 2010/0280774 A1* | 11/2010 | Ewing | H04Q 9/00 |
| | | | 702/60 |
| 2011/0173432 A1* | 7/2011 | Cher | G01R 31/31725 |
| | | | 713/100 |
| 2011/0291705 A1 | 12/2011 | Fukami | |
| 2013/0031353 A1* | 1/2013 | Noro | G06F 1/3212 |
| | | | 713/100 |
| 2014/0215429 A1* | 7/2014 | Bickford | G06F 17/5036 |
| | | | 716/136 |
| 2014/0281630 A1 | 9/2014 | Chien et al. | |
| 2015/0277534 A1 | 10/2015 | Park et al. | |
| 2015/0309649 A1* | 10/2015 | Lee | G06F 3/0416 |
| | | | 345/173 |
| 2016/0036229 A1* | 2/2016 | Shao | G05B 15/02 |
| | | | 700/298 |

* cited by examiner

SEMICONDUCTOR DEVICE AND SEMICONDUCTOR SYSTEM

This application claims priority to Korean Patent Application No. 10-2017-0016880 filed on Feb. 7, 2017 in the Korean Intellectual Property Office, and all the benefits accruing therefrom under 35 U.S.C. § 119, the disclosure of which is incorporated herein by reference in its entirety.

BACKGROUND

1. Field

The present disclosure relates to a semiconductor device and a semiconductor system.

2. Description of the Related Art

Semiconductor devices such as a System-on-Chip (SoC) devices commonly include a plurality of transistors. The characteristics of the transistors may change over the duration of use thereof. For example, as the duration of use of the SoC increases, the threshold voltage of the transistors of the SoC may increase with age. As a result, the minimum operating voltage required for stable, failure-free operation of the SoC may need to increase over time.

In some configurations, a Power Management Integrated Circuit (PMIC) can be employed to supply power to the SoC. In order to secure the voltage margin necessary to prevent malfunction of the SoC, the PMIC may provide a supply voltage to the SoC that is higher than a minimum voltage required to ensure proper operation. Such an approach carries with it inherent power inefficiencies, which can be disadvantageous for portable electronics applications.

SUMMARY

Example embodiments of the present disclosure provide a semiconductor device capable of efficiently providing a voltage margin that accounts for one or more changes in the characteristics of the transistors thereof.

Example embodiments of the present disclosure also provide a semiconductor system capable of efficiently providing a voltage margin that accounts for one or more changes in the characteristics of the transistors thereof.

Example embodiments of the present disclosure are for illustrative purposes only; accordingly, the present inventive concepts are not restricted thereto. Other embodiments may have equal applicability to the present inventive concepts.

According to an example embodiment of the present disclosure a semiconductor device includes a monitoring circuit receiving a first operating voltage and a second operating voltage, which is different from the first operating voltage, from a Power Management Integrated Circuit (PMIC). The monitoring circuit monitors a duration of use of a System-on-Chip (SoC) at each of the first and second operating voltages. A processing circuit calculates a normalized value based on predetermined weight information from the duration of use of the SoC at each of the first and second operating voltages. A voltage circuit determines whether to increase an operating voltage of the SoC by comparing the normalized value with a predetermined value.

According to another example embodiment of the present disclosure, a semiconductor system includes a power management integrated circuit (PMIC); a system on a chip (SoC) receiving a first operating voltage and a second operating voltage, which is different from the first operating voltage, from the PMIC and operating at each of the first and second operating voltages. A memory stores therein a statistical model for controlling an operating voltage of the SoC based on a duration of use of the SoC at each of the first and second operating voltages. The SoC includes a monitoring circuit, which monitors the duration of use of the SoC at each of the first and second operating voltages, a processing circuit, which calculates a normalized value based on predetermined weight information, provided by the statistical model, and using the duration of use of the SoC at each of the first and second operating voltages, and a voltage circuit, which determines whether to increase an operating voltage of the SoC by comparing the normalized value with a predetermined value Other features and example embodiments may be apparent from the following detailed description, the drawings, and the claims.

BRIEF DESCRIPTION OF THE DRAWINGS

The above and other example embodiments and features of the present disclosure will become more apparent by describing in detail example embodiments thereof with reference to the attached drawings, in which.

DETAILED DESCRIPTION

Figure 1:
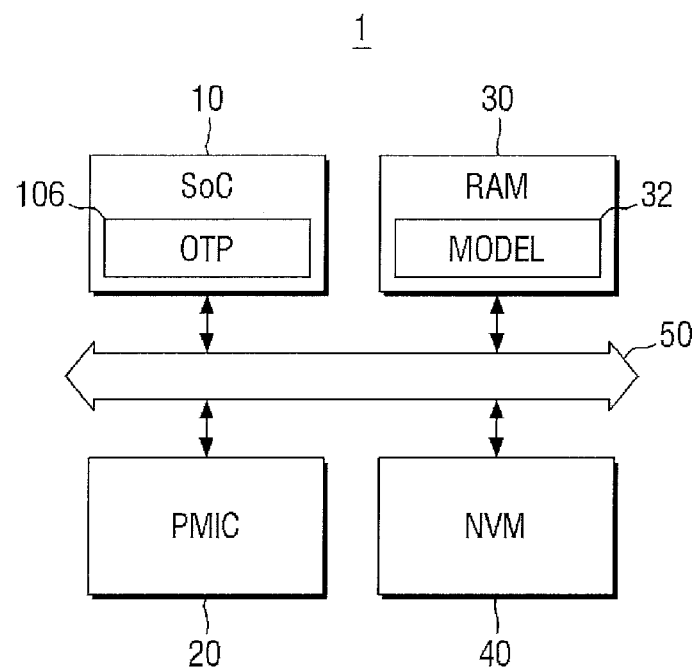
FIG. 1 is a schematic view illustrating a semiconductor system according to an example embodiment of the present disclosure in accordance with the present inventive concepts.

FIG. 1 is a schematic view illustrating a semiconductor system according to an example embodiment of the present disclosure.

Referring to FIG. 1, a semiconductor system 1 includes a System-on-Chip (SoC) 10, a Power Management Integrated Circuit (PMIC) 20, a Random Access Memory (RAM) 30, and a nonvolatile memory 40. The SoC 10, the PMIC 20, the RAM 30, and the nonvolatile memory 40 may be electrically connected to one another via a bus 50 and may thus exchange data signals, address signals, command signals, and control signals with one another.

The SoC 10 includes a plurality of transistors. The characteristics of these transistors may change over the duration of use of the SoC 10. For example, in some embodiments, the threshold voltage Vth of the transistors may increase along with increased age of the SoC device.

Figure 2:
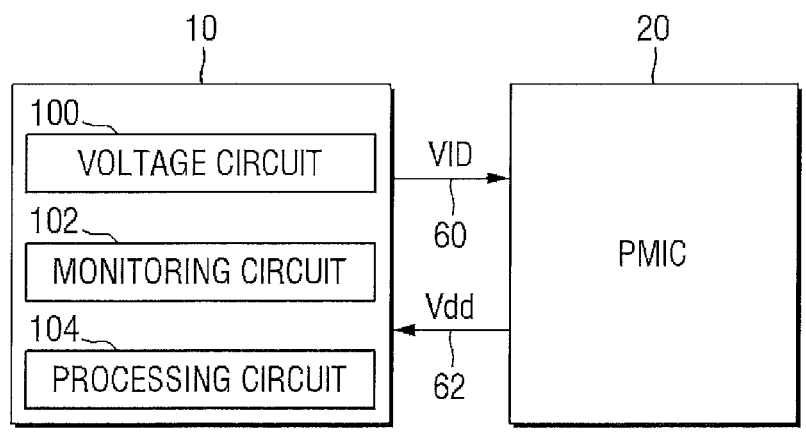
FIG. 2 is a schematic view illustrating a semiconductor device according to an example embodiment of the present disclosure in accordance with the present inventive concepts.

Referring to FIG. 2, the SoC 10 receives an operating voltage Vdd from the PMIC 20. If the threshold voltage of the transistors of the SoC 10 increases, a minimum operating voltage required for the SoC 10 to operate reliably, without failure, likewise increases. Thus, variation of the magnitude of the minimum operating voltage Vdd may be needed over time in order to accommodate changes in characteristics in the transistors of the SoC 10. In some example embodiments of the present disclosure, the duration of use of the SoC 10 at each operating voltage is analyzed based on a statistical model that takes into account expected changes in the transistors of the SoC 10. As a result, a determination of the magnitude of a suitable operating voltage Vdd supplied to the device can be realized. In some embodiments, the determined operation voltage Vdd can having an appropriate margin that ensures reliable operation of the device. Details of the operation and configuration of the SoC 10 are described herein with reference to FIG. 2.

In some example embodiments, the SoC 10 may include an Application Processor (AP), which is implemented in a mobile device. However, embodiments of the present inventive concepts are not limited thereto and other configurations are equally applicable.

In some embodiments, the PMIC 20 can provide the operating voltage Vdd to various elements of the semiconductor system 1, including the SoC 10. In some embodiments, the PMIC can perform a power management function for the elements of the semiconductor system 1. For example, in some embodiments, the PMIC 20 may provide the operating voltage Vdd to the SoC 10 and may adjust the operating voltage Vdd as necessary. More specifically, in a situation where the duration of operation of the SoC 10 is a more critical parameter, the PMIC 20 may reduce the operating voltage Vdd, or may stop providing the operating voltage Vdd, in order to conserve power. On the other hand, when there is a need to secure enhanced performance of the SoC 10, the PMIC 20 may increase the operating voltage Vdd.

In some embodiments, the RAM 30 may load software or other commands, that can be executed by the SoC 10. The SoC 10 may execute or access the software loaded in the RAM 30, particularly, software 32, which provides the statistical model of the behavior of the transistors of the SoC, as described above with reference to FIG. 1.

In some example embodiments, the RAM 30 may include a Dynamic RAM (DRAM), a Static RAM (SRAM), or the like, but the present disclosure is not limited thereto. However, embodiments of the present inventive concepts are not limited thereto and other RAM configurations are equally applicable.

The nonvolatile memory 40 may store various data, including data processed by the SoC 10. In some example embodiments, the nonvolatile memory 40 may include a flash memory. However, embodiments of the present inventive concepts are not limited thereto and non-volatile memory configurations are equally applicable.

In some embodiments, the SoC 10 may further include a One Time Programmable Read Only Memory (OTP ROM). An example of this embodiment is described herein with reference to FIG. 6.

Although not specifically illustrated in FIG. 1, in some embodiments, the semiconductor system 1 may further include a clock management circuit. The clock management circuit may provide a clock signal for driving the SoC 10 and may adjust the frequency of the clock signal according to a desired power management policy of the semiconductor system 1.

In some example embodiments, the PMIC 20 and the clock management circuit may operate according to a Dynamic Voltage Frequency Scaling (DVFS) operation to perform power management for the SoC 10 and, in some cases, to the entire semiconductor system 1 including the SoC 10.

FIG. 2 is a schematic view illustrating a semiconductor device according to an example embodiment of the present disclosure.

Referring to FIG. 2, a semiconductor device 10, i.e., the SoC 10, includes a voltage circuit 100, a monitoring circuit 102, and a processing circuit 104.

In some embodiments, the voltage circuit 100 transmits a request to the PMIC 20 to provide an operating voltage Vdd to the SoC. For example, the voltage circuit 100 may provide a voltage code VID signal to the PMIC 20 to request the operating voltage Vdd, which is necessary for the operation of the SoC 10. In some embodiments, the PMIC 20 may provide the operating voltage Vdd to the SoC 10 in response to the voltage code VID. In other embodiments the operating voltage Vdd may be provided based entirely on a determination made by the PMIC 20, rather than in response to the voltage code VID signal.

In some example embodiments, the voltage code VID, which is provided from the SoC 10 to the PMIC 20, may be used to determine the level of the operating voltage Vdd; however embodiments of the present disclosure are not limited thereto. In other example embodiments, a measurement of the voltage provided from the PMIC 20 to the SoC 10 may be used to determine the level of the operating voltage Vdd; however, embodiments of the present disclosure are not limited thereto.

The monitoring circuit 102 monitors the duration of use of the SoC 10 at each operating voltage Vdd. The SoC 10 may be caused to operate at various operating voltages Vdd as necessary, for example, according to a power management policy. For example, the SoC 10 may operate at a first operating voltage for a first duration of use and may then be switched from operation at the first operating voltage to operation a second operating voltage, which is different from the first operating voltage for a second duration of use, according to a power management policy. Thereafter, the SoC 10 may be returned from operation at the second operating voltage back to operation at the first operating voltage as necessary or may be switched to operate at a third operating voltage, which is different from the first and second operating voltages, for a third duration of use. In some embodiments, the duration of use may correspond to a time duration of use of the SoC device. In some embodiments, the time duration of use of operation at a certain operating voltage may correspond to a time duration of use of the SoC device at that operating voltage.

In some example embodiments, the monitoring circuit 102 may monitor, or otherwise calculate or determine, the total cumulative amount of time for which the SoC 10 operates at the first operating voltage as the duration of use of the SoC 10 at the first operating voltage. Similarly, the monitoring circuit 102 may monitor, or calculate, the total cumulative amount of time for which the SoC 10 operates at the second operating voltage as the duration of use of the SoC 10 at the second operating voltage. In order to calculate the duration of use of the SoC 10 at each of the first and second operating voltages, the monitoring circuit 102 may use, in some example embodiments, a plurality of digital counters. An embodiment that utilizes digital counters is described herein in connection with the embodiment of FIG. 4.

In some embodiments, the processing circuit 104 calculates a normalized time value that considers a duration of use of the SoC 10 at each operating voltage, provided by the monitoring circuit 102, along with predetermined weight information. For example, in some embodiments, the predetermined weight information can include a plurality of weight values set for different operating voltages, Such weight values may be reflected in the duration of use of the SoC 10 at each operating voltage, as measured by the monitoring circuit 102. An example embodiment of this operation is described herein with reference to the embodiment of FIG. 5.

In some example embodiments, the processing circuit 104 may receive the predetermined weight information from the statistical model described herein in connection with to the embodiment of FIG. 1. That is, in some embodiments, the processing circuit 104 may calculate the normalized time value based on the statistical model that takes into account the changing characteristics of the transistors of the SoC 10.

The voltage circuit 100 compares the normalized time value provided by the processing circuit 104 with a predetermined value to determine whether to increase, decrease, or otherwise adjust, the operating voltage Vdd. For example, in some embodiments, the voltage circuit 100 can cause an increase in the level of the operating voltage Vdd if the normalized value provided by the processing circuit 104 is determined to exceed the predetermined value. Further, the voltage circuit 100 can cause the operating voltage Vdd to remain the same, if the normalized value provided by the processing circuit 104 is determined to not exceed the predetermined value.

In some example embodiments, the voltage circuit 100 may receive the predetermined value from the statistical model described herein with reference to FIG. 1. That is, the voltage circuit 100 may determine whether to increase the operating voltage Vdd based on the statistical model that takes into account the changing characteristics of the transistors of the SoC 10.

In some example embodiments, the voltage circuit 100, the monitoring circuit 102, and the processing circuit 104 may be implemented as hardware, but the present disclosure is not limited thereto. That is, in some embodiments, at least one of the voltage circuit 100, the monitoring circuit 102, and the processing circuit 104 may be implemented as software, for example, software operating on a processor. For example, at least one of the voltage circuit 100, the monitoring circuit 102, and the processing circuit 104 may be implemented as software, may be loaded into the RAM 30, and may then be executed by the SoC 10.

Figure 3:
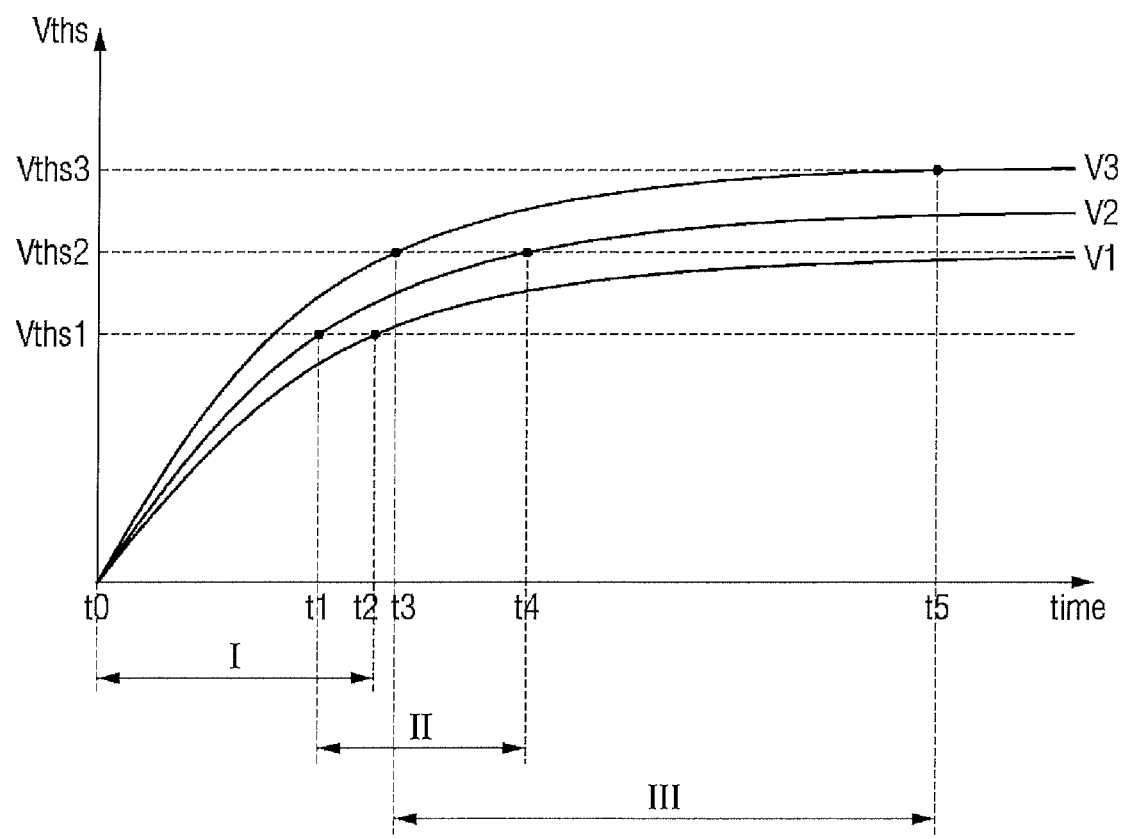
FIG. 3 is a schematic view illustrating an operation of the semiconductor device according to the example embodiment of FIG. 2, in accordance with the present inventive concepts.

FIG. 3 is a schematic view illustrating an operation of the semiconductor device according to the example embodiment of FIG. 2.

FIG. 3 is a graph illustrating an operation of the SoC 10. The X-axis indicates the duration of use of the SoC 10. The Y-axis indicates the degree of change in the transistors of the SoC 10. In the present example, the degree of change in the transistors of the SoC 10 may be numerically represented based on the degree to which the threshold voltage Vth of the transistors of the SoC 10 increases as a function of increased duration of use of the transistors. For example, a first voltage Vths1 represents the amount of change (for example, the amount of increase) of the threshold voltage of the transistors of the SoC 10 in a case where a minimum operating voltage at which the SoC 10 can operate reliably has a margin of, for example, 25.0 mV, a second voltage Vths2 represents the amount of change of the threshold voltage of the transistors of the SoC 10 in a case where the minimum operating voltage at which the SoC 10 can reliably operate has a margin of, for example, 37.5 mV, and a third voltage Vths3 represents the amount of change of the threshold voltage of the transistors of the SoC 10 in a case where the minimum operating voltage at which the SoC 10 can reliably operate has a margin of, for example, 50.0 mV.

That the minimum operating voltage at which the SoC 10 can operate has a margin of, for example, 25.0 mV, in connection with the voltage Vths1 means that the SoC 10 can be allowed to operate as long as the threshold voltage of the transistors of the SoC 10 increases only within a range corresponding to the margin of 25.0 mV, for example, within the range of 0.3 V to 0.31 V (i.e., as long as the threshold voltage of the transistors of the SoC 10 increases by only up to 10 mV).

During a first time period I of operation, the SoC 10 receives a first operating voltage V1 of, for example, 1.175 V. As the duration of use of the SoC 10 increases from time t0 to time t2, the trajectory of the first operating voltage V1 reaches the voltage Vths1 at time t2.

At time t2, if the SoC 10 continues to operate while receiving only the first operating voltage V1, the threshold voltage of the transistors of the SoC 10 may increase beyond a permissible range. Accordingly, the SoC 10 may malfunction under these conditions.

To avoid this possibility, the SoC 10 monitors duration of use at each operating voltage and determines a point of time (i.e., time t2) when the threshold voltage of the transistors of the SoC 10 reaches the upper bound of the permissible range. When this point of time has been reached, is about to be reached, or will be reached, the SoC 10 is configured to send a request to the PMIC 20 to increase the operating voltage Vdd. In response, the PMIC 20 provides the SoC 10 with a second operating voltage V2 of, for example, 1.1875 V, which is higher than the first operating voltage V1. In the present example embodiment, the change in the operating voltage from V1 to V2 is determined to take place at time t1, that is, a time just prior to the known point of time (i.e. time t2) when the threshold voltage of the transistors was to reach the upper bound of the permissible range.

The PMIC 20 causes the SoC 10 to operate at the second operating voltage V2 during a second time period II of operation beginning from time t1. That is, as the operating voltage Vdd of the SoC increases from the first operating voltage V1 to the second operating voltage V2, the operating life of the SoC 10 increases from t1 to t2, as compared to a case where the SoC 10 continuously operates at the second operating voltage V2 from the outset. At the same time, power is conserved during the portion of the first time period I when operation at the first operating voltage V1, lower than the second operating voltage V2, is realized.

In the chart of FIG. 3, is can be seen that as the duration of use of the SoC 10 increases through the second time period II of operation, the trajectory of the second operating voltage V2 will reach the upper bound of the permissible range of the threshold voltage of the transistors, i.e., voltage Vths2, at time t4.

At time t4, if the SoC 10 continues to operate while receiving only the second operating voltage V2, the threshold voltage of the transistors of the SoC 10 may increase beyond a permissible range. Accordingly, the SoC 10 may malfunction under these conditions.

To avoid this possibility, the SoC 10 monitors duration of use at each operating voltage and determines a point of time (i.e., time t4) when the threshold voltage of the transistors of the SoC 10 reaches the upper bound of the permissible range.

When this point of time has been reached, is about to be reached, or will be reached, the SoC 10 is configured to send a request to the PMIC 20 to increase the operating voltage Vdd. In response, the PMIC 20 provides the SoC 10 with a third operating voltage V3 of, for example, 1.20 V, which is higher than the second operating voltage V2. In the present example embodiment, the change in the operating voltage from V2 to V3 is determined to take place at time t3, that is, a time just prior to the known point of time (i.e. time t4) when the threshold voltage of the transistors was to reach the upper bound of the permissible range.

The PMIC 20 causes the SoC 10 to operate at the third operating voltage V3 during a third time period III of operation beginning from time t3. That is, as the operating voltage Vdd of the SoC increases from the second operating voltage V2 to the third operating voltage V3, the operating life of the SoC 10 increases from t3 to t5, as compared to a case where the SoC 10 continuously operates at the third operating voltage V3 from the outset. At the same time, power is conserved during the portion of the second time period II when operation at the second operating voltage V2, lower than the third operating voltage V3 is realized.

In the chart of FIG. 3, is can be seen that as the duration of use of the SoC 10 increases through the third time period III of operation, the trajectory of the third operating voltage V3 will reach the upper bound of the permissible range of the threshold voltage of the transistors, i.e., voltage Vths3, at time t5.

As described herein, by efficiently providing a voltage margin to the SoC 10 based on the statistical model that takes into consideration the trend of deterioration of the transistors of the SoC 10, the operating life of the SoC 10 can be extended from time t1 to time t2 or from time t3 to time t4, as compared to a case where the third operating voltage V3 is supplied to the SoC 10 from the outset of operation. In addition, since the operating voltage Vdd is sequentially increased in response to changes in the transistors of the SoC 10, power conservation can be realized, as compared to a case where the third operating voltage V3 is supplied to the SoC 10 from the outset of operation.

Figure 4:
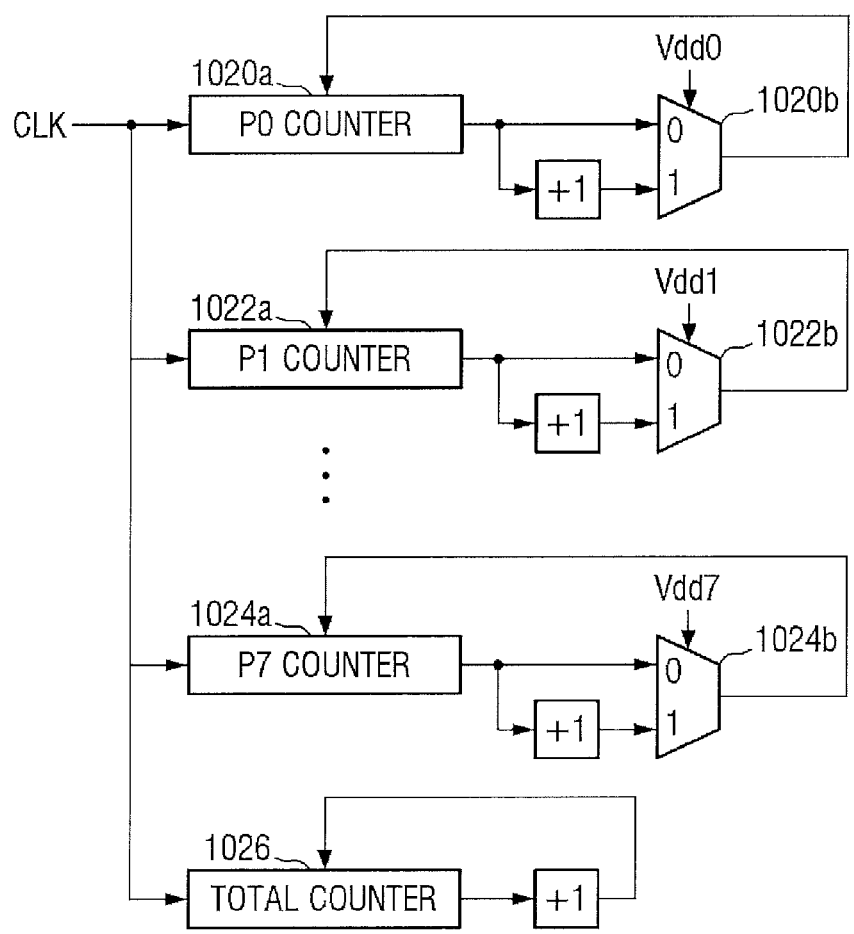
FIG. 4 is a schematic view illustrating the monitoring circuit illustrated in FIG. 2, in accordance with the present inventive concepts.

FIG. 4 is a schematic view illustrating an embodiment of the monitoring circuit illustrated in FIG. 2.

Referring to FIG. 4, the monitoring circuit 102 may include a plurality of counters 1020a, 1022a, 1024a, and 1026, which operate to monitor a duration of use of the SoC 10 at each of first through eighth operating voltages Vdd0 through Vdd7.

In the present example embodiment, counter 1020a may be used to monitor the duration of use of the SoC 10 at the first operating voltage Vdd0. For example, the counter 1020a may count the total cumulative amount of time, for example in clock cycles, or in multiples of clock cycles, for which the SoC 10 operates at the first operating voltage Vdd0, i.e., the duration of use of the SoC 10 at the first operating voltage Vdd0, by performing a counting operation with the aid of a multiplexer circuit 1020b, which uses the first operating voltage Vdd0 as a selection signal.

Similarly, the counters 1022a and 1024a may be used to monitor the duration of use of the SoC 10 at the second operating voltage Vdd1 and the duration of use of the SoC 10 at the eighth operating voltage Vdd7, respectively. For example, the counter 1022a may count the total cumulative amount of time for which the SoC 10 operates at the second operating voltage Vdd1, i.e., the duration of use of the SoC 10 at the second operating voltage Vdd1, by performing counting with the aid of a multiplexer circuit 1022b, which uses the second operating voltage Vdd1 as a selection signal. Likewise the counter 1024a may count the total cumulative amount of time for which the SoC 10 operates at the eighth operating voltage Vdd7, i.e., the duration of use of the SoC 10 at the eighth operating voltage Vdd7, by performing counting with the aid of a multiplexer circuit 1024b, which uses the eighth operating voltage Vdd7 as a selection signal.

The counter 1026 may count the total duration of use of the SoC 10 irrespective of the levels of the first through eighth operating voltages Vdd0 through Vdd7.

The embodiment of the monitoring circuit 102 of FIG. 4 is merely an example embodiment. The monitoring circuit for determining an overall duration of use and a time period for operation at each operating voltage Vdd0-x may be implemented in various manners without departing from the scope of the inventive concepts of the present disclosure.

Figure 5:
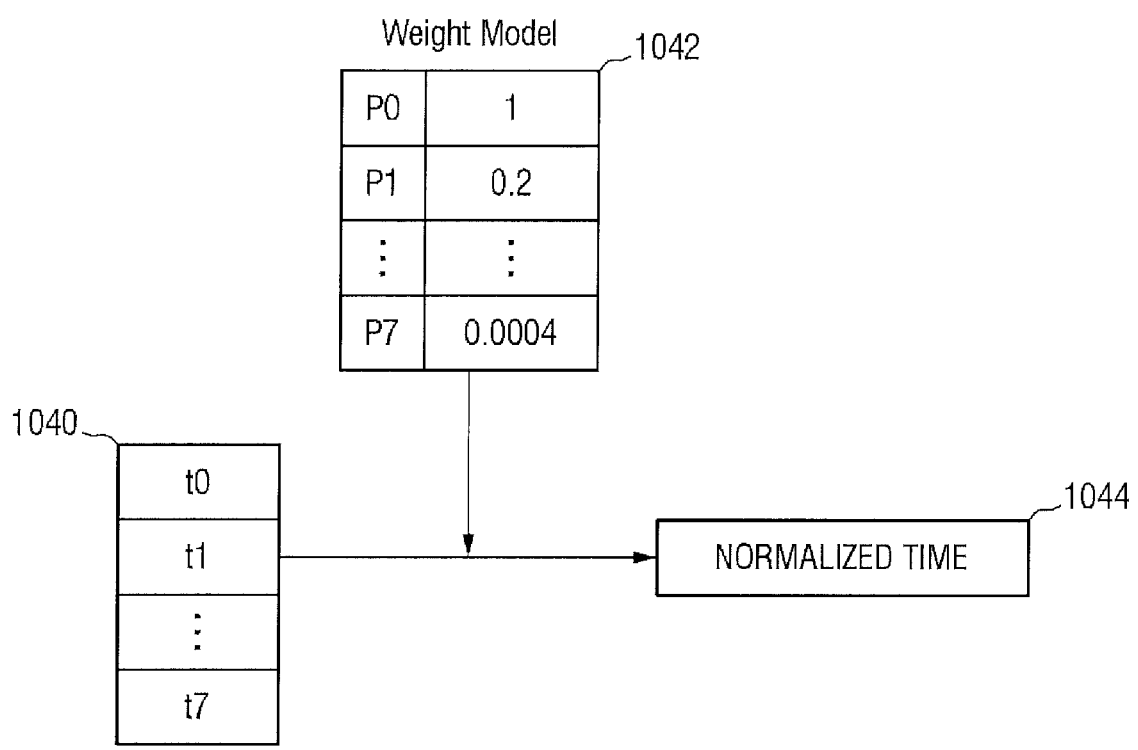
FIG. 5 is a schematic view illustrating the operation of the processing circuit illustrated in FIG. 2 in accordance with the present inventive concepts.

FIG. 5 is a schematic view illustrating the operation of the processing circuit illustrated in FIG. 2.

Referring to FIG. 5, the processing circuit 104 operates to calculate a normalized time value 1044 using operating voltage usage data 1040, provided by the monitoring circuit 102, and predetermined weight information 1042.

More specifically, the operating voltage usage data 1040 includes measured data related to the duration of use of the SoC 10 at each of the first through eighth operating voltages Vdd0 through Vdd7 of FIG. 4, i.e., t0 through t7.

In some embodiments, the weight information 1042 can include eight weight values corresponding to eight durations of use of the SoC 10, respectively, at the first through eighth operating voltages Vdd0 through Vdd7, respectively, i.e., t0 through t7. For example, in an example embodiment, the weight value corresponding to the duration of use of the SoC 10 at the first operating voltage Vdd0, i.e., t0, is 1, the weight value corresponding to the duration of use of the SoC 10 at the second operating voltage Vdd1, i.e., t1, is 0.2, and the weight value corresponding to the duration of use of the SoC 10 at the eighth operating voltage Vdd7, i.e., t7, is 0.0004.

The processing circuit 104 can calculate the normalized value 1044 using the operating voltage usage data 1040 and the weight information 1042. For example, the processing circuit 104 may calculate the normalized value 1044, as indicated by Equation (1):

$$\text{Normalized time} = 1 \cdot t0 + 0.2 \cdot t1 + \ldots + 0.0004 \cdot t7 \qquad (1).$$

The calculation of the normalized value 1044 with the use of the operating voltage usage data 1040 and the weight information 1042, as shown in Equation (1), is, however, merely an example, and the present disclosure is not limited thereto.

Thereafter, the voltage circuit 100 can determine whether to increase the operating voltage Vdd by comparing the normalized value 1044 provided by the processing circuit 104 with the predefined value provided by the statistical model. For example, if the predefined value provided by the statistical model is a value such as 58000 and the normalized value 1044 exceeds 58000, the operating voltage Vdd may be increased.

As described above, the operating life of the SoC 10 can be extended by efficiently providing a voltage margin to the SoC 10 based on the statistical model that takes into consideration the changing characteristics of the transistors of the SoC 10. In addition, since the operating voltage Vdd is sequentially increased in consideration of the changing characteristics of the transistors of the SoC 10, efficient conservation of power can be achieved.

Figure 6:
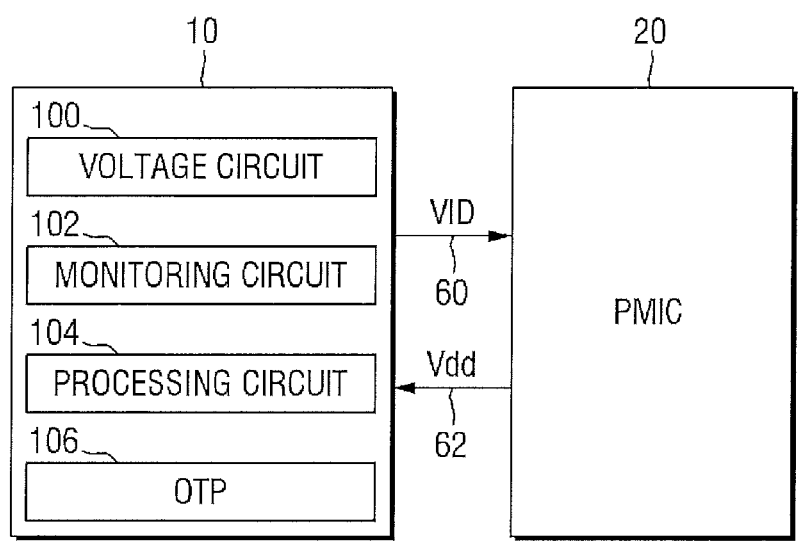
FIG. 6 is a schematic view illustrating a semiconductor device according to another example embodiment of the present disclosure.

FIG. 6 is a schematic view illustrating a semiconductor device according to another example embodiment of the present disclosure.

Referring to FIG. 6, a semiconductor device 10, i.e., a SoC 10, includes a voltage circuit 100, a monitoring circuit 102, and a processing circuit 104, and further includes an OTP ROM 106.

In the example embodiment of FIG. 6, unlike in the example embodiment of FIG. 2, the processing circuit 104 may store a normalized value, which is calculated using the duration of use of the SoC 10 at each operating voltage, as provided by the monitoring circuit 102, in the OTP ROM 106.

The voltage circuit 100 may read the normalized value, which is calculated by the processing circuit 104 and is stored in the OTP ROM 106, and may determine whether to increase an operating voltage Vdd by comparing the normalized value with a predetermined value provided in advance by a statistical model.

Figure 7:
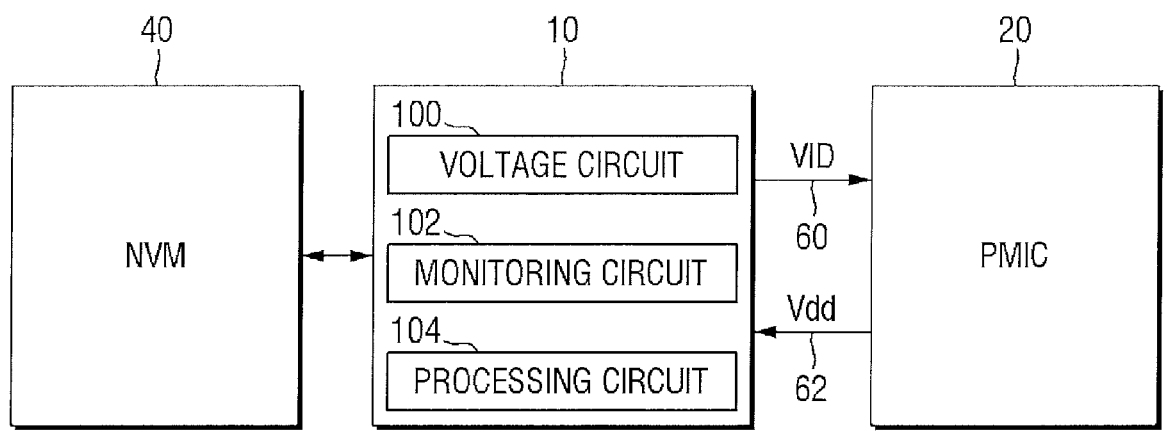
FIG. 7 is a schematic view illustrating a semiconductor device according to another example embodiment of the present disclosure.

FIG. 7 is a schematic view illustrating a semiconductor device according to another example embodiment of the present disclosure.

Referring to FIG. 7, a semiconductor device 10, i.e., a SoC 10, includes a voltage circuit 100, a monitoring circuit 102, and a processing circuit 104.

In the example embodiment of FIG. 7, unlike in the example embodiment of FIG. 2, the processing circuit 104 may store a normalized value, which is calculated using the duration of use of the SoC 10 at each operating voltage, provided by the monitoring circuit 102, in a nonvolatile memory 40.

The voltage circuit 100 may read the normalized value, which is calculated by the processing circuit 104 and is stored in the nonvolatile memory 40, and may determine whether to increase an operating voltage Vdd, which is provided to the SoC 10, by comparing the normalized value with a predetermined value provided in advance by a statistical model.

Figure 8:
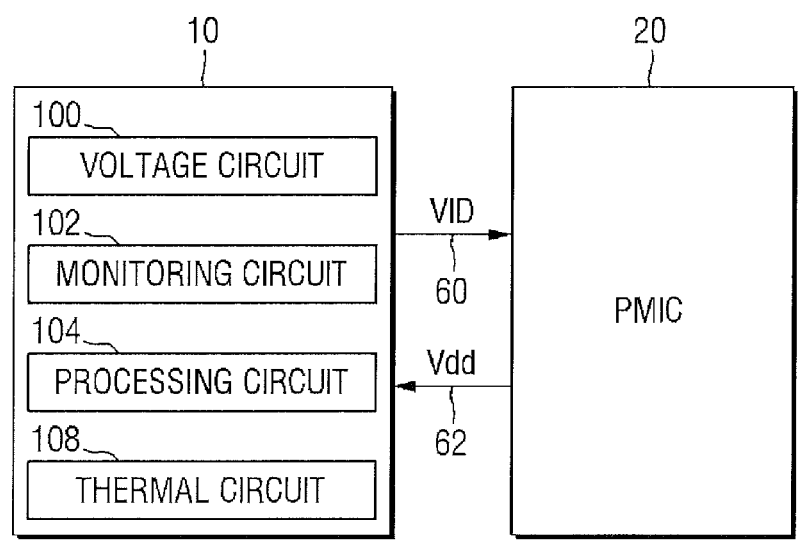
FIG. 8 is a schematic view illustrating a semiconductor device according to another example embodiment of the present disclosure.
Figure 9:
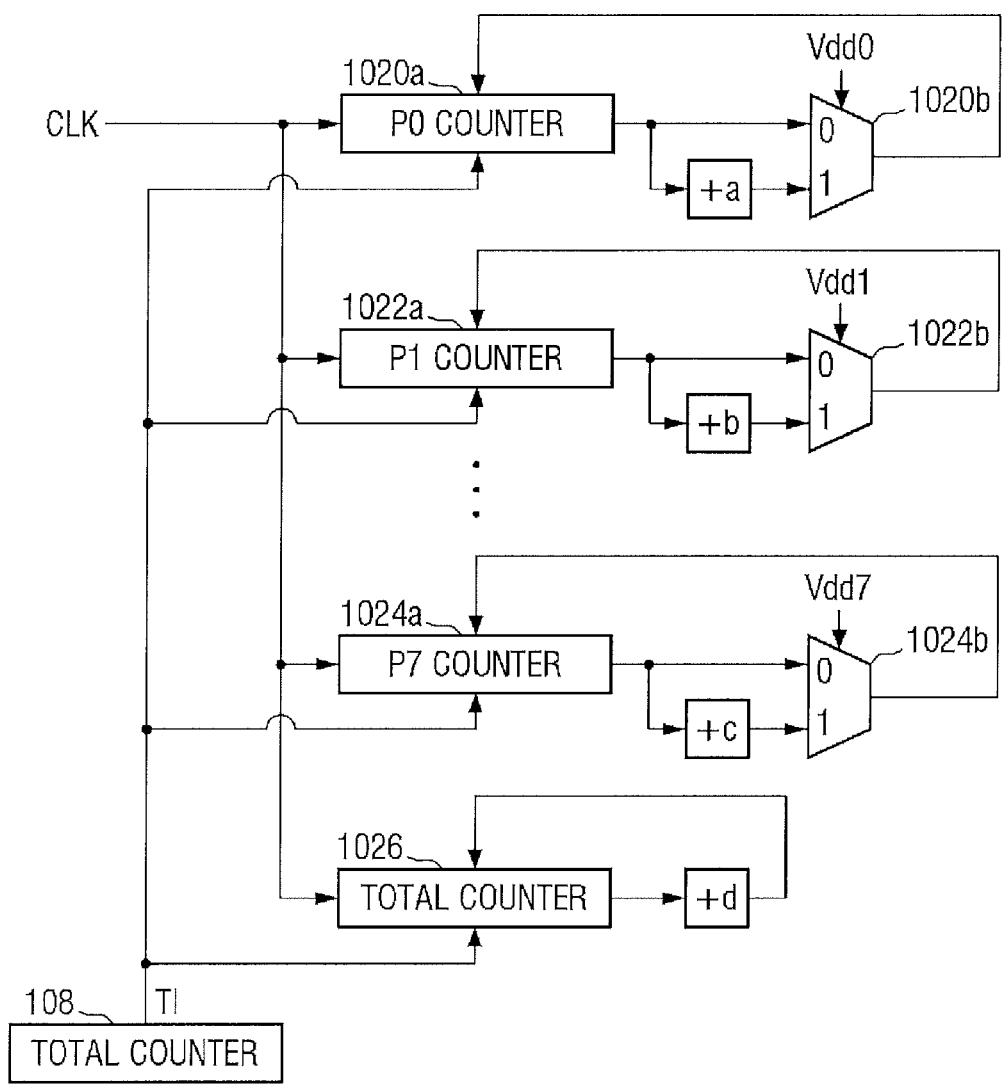
FIG. 9 is a schematic view illustrating a monitoring circuit illustrated in FIG. 8, in accordance with the present inventive concepts.

FIG. 8 is a schematic view illustrating a semiconductor device according to another example embodiment of the present disclosure, and FIG. 9 is a schematic view illustrating a monitoring circuit illustrated in FIG. 8.

Referring to FIG. 8, a semiconductor device 10, i.e., a SoC 10, includes a voltage circuit 100, a monitoring circuit 102, and a processing circuit 104, and further includes a thermal circuit 108.

The thermal circuit 108 monitors operating temperatures of the SoC 10 when operating at each operating voltage and provides the monitored operating temperatures to the monitoring circuit 102.

The monitoring circuit 102 may receive the monitored operating temperatures from the thermal circuit 108. The monitoring circuit 102 may calculate the duration of use of the SoC 10 at the first operating voltage Vdd0 using the total cumulative amount of time for which the SoC 10 operates at the first operating voltage Vdd0 and, in addition, operating temperatures of the SoC 10 for the first operating voltage Vdd0, provided by the thermal circuit 108. Similarly, the monitoring circuit 102 may calculate the duration of use of the SoC 10 at a second operating voltage Vdd1 using the total cumulative amount of time for which the SoC 10 operates at the second operating voltage Vdd1 and, in addition, operating temperatures of the SoC 10 for the second operating voltage Vdd1, provided by the thermal circuit 108. In order to calculate the duration of use of the SoC 10 at each of the first and second operating voltages, the monitoring circuit 102 may use, for example, a plurality of counters illustrated in FIG. 9.

For example, it is assumed that a weight value for the duration of use of the SoC 10 at a first operating voltage Vdd0 at a first operating temperature T1, i.e., t01, is 0.1 and a weight value for the duration of use of the SoC 10 at the first operating voltage Vdd0 at a second operating temperature T2, i.e., t02, is 0.2. Referring to Equation (1), which is for finding the normalized value 1044 of FIG. 5, a first term for the first operating voltage Vdd0 may be expressed as $1 \cdot t0$. By reflecting the weight value for the duration of use of the SoC 10 at the first operating voltage Vdd0 at the first operating temperature T1 and the weight value for the duration of use of the SoC 10 at the first operating voltage Vdd0 at the second operating temperature T2, the first term for the first operating voltage Vdd0 may be represented by Equation (2):

$$1 \cdot t0 = 1 \cdot (0.1 \cdot t01 + 0.2 \cdot t02) \qquad (2).$$

Similarly, it is assumed that a weight value for the duration of use of the SoC 10 at the second operating voltage Vdd1 at a third operating temperature T3, i.e., t11, is 0.25 and a weight value for the duration of use of the SoC 10 at the second operating voltage Vdd1 at a fourth operating temperature T4, i.e., t12, is 0.3. Referring to Equation (1), which is for finding the normalized value 1044 of FIG. 5, a second term for the second operating voltage Vdd1 may be expressed as $0.2 \cdot t1$. By reflecting the weight value for the duration of use of the SoC 10 at the second operating voltage Vdd1 at the third operating temperature T3 and the weight value for the duration of use of the SoC 10 at the second operating voltage Vdd1 at the fourth operating temperature T4, the second term for the second operating voltage Vdd1 may be represented by Equation (3):

$$0.2 \cdot t1 = 0.2 \cdot (0.25 \cdot t11 + 0.3 \cdot t12) \qquad (3).$$

Equation (1) described above with reference to FIG. 5 may be modified by reflecting the weight values for various operating temperatures. In this manner, the normalized time value can take into account the operating temperature of the SoC at each operating voltage Vdd0 through Vdd7. While the present embodiment is illustrative of such a configuration for taking into account operating temperature, it is apparent that other embodiments may be equally applicable to the principles of the present inventive concepts.

Referring to FIGS. 8 and 9, the monitoring circuit 102 may include a plurality of counters 1020a, 1022a, 1024a, and 1026, operational for measuring the duration of use of the SoC 10 at each of first through eighth operating voltages Vdd0 through Vdd7.

The thermal circuit 108 monitors operating temperatures of the SoC 10 for each operating voltage and provides the monitored operating temperatures to the counters 1020a, 1022a, 1024a, and 1026.

The counter 1020a may precisely count the total cumulative amount of time for which the SoC 10 operates at the first operating voltage Vdd0, i.e., the duration of use of the SoC 10 at the first operating voltage Vdd0, by performing counting with the aid of a multiplexer circuit 1020b, which uses the first operating voltage Vdd0 as a selection signal, to reflect operating temperatures of the SoC 10 for the first operating voltage Vdd0, provided by the thermal circuit 108. The value added to the counter 1020a may be a first value a (where the first value a is an integer of 1 or greater) determined by a statistical model.

Similarly, the counter 1022a may precisely count the total cumulative amount of time for which the SoC 10 operates at the second operating voltage Vdd1, i.e., the duration of use of the SoC 10 at the second operating voltage Vdd1, by performing counting with the aid of a multiplexer circuit 1022b, which uses the second operating voltage Vdd1 as a selection signal, to reflect operating temperatures of the SoC 10 for the second operating voltage Vdd1, provided by the thermal circuit 108, and the counter 1024a may precisely count the total cumulative amount of time for which the SoC 10 operates at the eighth operating voltage Vdd7, i.e., the duration of use of the SoC 10 at the eighth operating voltage Vdd7, by performing counting with the aid of a multiplexer circuit 1024b, which uses the eighth operating voltage Vdd7 as a selection signal, to reflect operating temperatures of the SoC 10 for the eighth operating voltage Vdd7, provided by the thermal circuit 108. The value added to the counter 1022a may be a second value b (where the second value b is an integer of 1 or greater) determined by the statistical model, and the value added to the counter 1024a may be a third value c (where the third value c is an integer of 1 or greater) determined by the statistical model.

The monitoring circuit 102 of the embodiment of FIG. 9 is merely an example embodiment, and may be implemented in various manners without departing from the scope of the inventive concepts of the present disclosure.

As described above, a voltage margin can be efficiently provided to the SoC 10 by reflecting operating temperatures of the SoC 10 for each operating voltage into the duration of use of the SoC 10 at each operating voltage. As a result, the operating life of the SoC 10 can be extended, and power conservation can be more efficiently managed.

In some example embodiments, the voltage circuit 100, the monitoring circuit 102, the processing circuit 104, and the thermal circuit 108 may be implemented as hardware, but the present disclosure is not limited thereto. That is, in some embodiments, at least one of the voltage circuit 100, the monitoring circuit 102, the processing circuit 104, and the thermal circuit 108 may be implemented as software. For example, at least one of voltage circuit 100, the monitoring circuit 102, the processing circuit 104, and the thermal circuit 108 may be implemented as software, may be loaded into a RAM 30, and may then be executed by a processor of the SoC 10.

The method in which the operating voltage Vdd is sequentially increased to efficiently provide a voltage margin to the SoC 10 has been described, but the present disclosure is not limited thereto.

That is, the operating frequency of the SoC 10 may be limited using, for example, DVFS, before increasing the operating voltage Vdd.

More specifically, in connection with this embodiment, referring again to FIG. 3, in response to the anticipated arrival of time t4 when the SoC 10 operates by receiving the second operating voltage V2, the threshold voltage of the transistors of the SoC 10 may increase beyond a permissible range, and, as a result, the SoC 10 may malfunction.

In order to prevent this eventuality from happening, a method of sacrificing some performance of the SoC 10 by limiting the operating frequency, i.e., clock speed, of the SoC 10 to a predetermined range to delay the arrival of t4 may be used. According to this method, the life of the SoC 10 can be extended by as much as the amount by which the arrival of t4 is delayed.

According to the aforementioned and other example embodiments of the present disclosure, the operating life of the SoC 10 may be extended by efficiently providing a voltage margin to the SoC 10 based on a statistical model that takes into account changes in the transistors of the SoC 10. In addition, power can be more efficiently conserved by sequentially increasing the operating voltage Vdd to account for the changing characteristics of the transistors of the SoC 10.

While the present disclosure has been particularly illustrated and described with reference to example embodiments thereof, it will be understood by those of ordinary skill in the art that various changes in form and detail may be made therein without departing from the spirit and scope of the present disclosure as defined by the following claims. The example embodiments should be considered in a descriptive sense only and not for purposes of limitation.

What is claimed is:

1. A semiconductor device, comprising:
a monitoring circuit receiving a first operating voltage and a second operating voltage, which is different from the first operating voltage, from a Power Management Integrated Circuit (PMIC), the monitoring circuit monitoring a duration of use of a System-on-Chip (SoC) at each of the first and second operating voltages;
a processing circuit calculating a normalized value based on predetermined weight information from the duration of use of the SoC at the first operating voltage and the duration of use of the SoC at the second operating voltages; and
a voltage circuit determining whether to increase an operating voltage of the SoC by comparing the normalized value with a predetermined value.

2. The semiconductor device of claim 1, wherein the monitoring circuit further calculates a total cumulative amount of time for which the SoC operates at the first operating voltage as a duration of use of the SoC at the first operating voltage and calculates a total cumulative amount of time for which the SoC operates at the second operating voltage as a duration of use of the SoC at the second operating voltage.

3. The semiconductor device of claim 2, wherein the monitoring circuit includes a first counter, that monitors the duration of use of the SoC at the first operating voltage, and a second counter, that monitors the duration of use of the SoC at the second operating voltage.

4. The semiconductor device of claim 1, further comprising:
a statistical model stored in a memory, which is electrically connected to the semiconductor device,
wherein the processing circuit and the voltage circuit receive the predetermined weight information and the predetermined value from the statistical model.

5. The semiconductor device of claim 1, wherein
the SoC includes a One Time Programmable Read Only Memory (OTP ROM), and
the processing circuit stores the normalized value in the OTP ROM.

6. The semiconductor device of claim 1, wherein the processing circuit stores the normalized value in a nonvolatile memory external to the SoC.

7. The semiconductor device of claim 1, wherein the voltage circuit increases the operating voltage of the SoC if the normalized value is determined to exceed the predetermined value and wherein the voltage circuit does not increase the operating voltage of the SoC if the normalized value is determined to not exceed the predetermined value.

8. The semiconductor device of claim 1, wherein the voltage circuit limits an operating frequency of the SoC before increasing the operating voltage of the SoC.

9. The semiconductor device of claim 1, further comprising:
a thermal circuit monitoring operating temperatures of the SoC during operation at each of the first and second operating voltages and providing the monitored operating temperatures to the monitoring circuit.

10. The semiconductor device of claim 9, wherein the monitoring circuit calculates at least one of a duration of use of the SoC at the first operating voltage and a duration of use of the SoC at the second operating voltage using a total cumulative amount of time for which the SoC operates at at least one of the first and second operating voltages and operating temperatures at which the SoC operates at at least one of the first and second operating voltages.

11. A semiconductor device, comprising:
a power management integrated circuit (PMIC);
a system on a chip (SoC) receiving a first operating voltage and a second operating voltage, which is different from the first operating voltage, from the PMIC and operating at each of the first and second operating voltages; and
a memory storing therein a statistical model for controlling an operating voltage of the SoC based on a duration of use of the SoC at each of the first and second operating voltages,
wherein the SoC includes:
a monitoring circuit, which monitors the duration of use of the SoC at each of the first and second operating voltages,
a processing circuit, which calculates a normalized value using predetermined weight information, provided by the statistical model, and using the duration of use of the SoC at the first operating voltage and the duration of use of the SoC at the second operating voltages, and
a voltage circuit, which determines whether to increase an operating voltage of the SoC by comparing the normalized value with a predetermined value.

12. The semiconductor device of claim 11, wherein the monitoring circuit further calculates a total cumulative amount of time for which the SoC operates at the first operating voltage as a duration of use of the SoC at the first operating voltage and calculates a total cumulative amount of time for which the SoC operates at the second operating voltage as a duration of use of the SoC at the second operating voltage.

13. The semiconductor device of claim 11, wherein
the SoC includes an OTP ROM, and
the processing circuit stores the normalized value in the OTP ROM.

14. The semiconductor device of claim 11, further comprising:
a nonvolatile memory outside the SoC,
wherein the processing circuit stores the normalized value in the nonvolatile memory.

15. The semiconductor device of claim 11, wherein the voltage circuit increases the operating voltage of the SoC if the normalized value is determined to exceed the predetermined value and does not increase the operating voltage of the SoC if the normalized value is determined to not exceed the predetermined value.

16. The semiconductor device of claim 11, wherein the SoC includes an Application Processor (AP), which is implemented in a mobile device.

17. The semiconductor device of claim 11, wherein the voltage circuit limits an operating frequency of the SoC before increasing the operating voltage of the SoC.

18. The semiconductor device of claim 11, further comprising:
a thermal circuit monitoring operating temperatures of the SoC during operation at the first and second operating voltages and providing the monitored operating temperatures to the monitoring circuit.

19. The semiconductor device of claim 18, wherein the monitoring circuit calculates at least one of a duration of use of the SoC at the first operating voltage and a duration of use of the SoC at the second operating voltage using a total cumulative amount of time for which the SoC operates at at least one of the first and second operating voltages and operating temperatures at which the SoC operates at at least one of the first and second operating voltages.

20. A semiconductor device, comprising:
a monitoring circuit constructed and arranged to receive a first operating voltage and a second operating voltage, which is different than the first operating voltage, and monitor a duration of use of a System-on-Chip (SoC) at each of the operating voltages;
a processing circuit calculating a normalized value using predetermined weight information from the duration of use of the SoC at the first operating voltage and the duration of use of the SoC at the second operating voltage; and
a voltage circuit determining whether to increase an operating voltage of the SoC by comparing the normalized value with a predetermined value.

* * * * *